(12) United States Patent
Chen et al.

(10) Patent No.: US 8,844,404 B2
(45) Date of Patent: Sep. 30, 2014

(54) PEDAL WITH A SENSING DEVICE

(71) Applicants: Wellgo Pedal's Corp., Taichung (TW);
Giant Manufacturing Co., Ltd.,
Taichung (TW)

(72) Inventors: Chung-I Chen, Taichung (TW);
Chih-Hsiang Shen, Taichung (TW)

(73) Assignees: Wellgo Pedal's Corp., Taichung (TW);
Giant Manufacturing Co., Ltd.,
Taichung (TW)

( * ) Notice: Subject to any disclaimer, the term of this patent is extended or adjusted under 35 U.S.C. 154(b) by 8 days.

(21) Appl. No.: 13/719,720

(22) Filed: Dec. 19, 2012

(65) Prior Publication Data

US 2014/0165779 A1 Jun. 19, 2014

(51) Int. Cl.
*B62M 3/08* (2006.01)

(52) U.S. Cl.
CPC ........................................ *B62M 3/08* (2013.01)
USPC ....................................................... 74/594.4

(58) Field of Classification Search
USPC ........ 74/560, 594.1, 594.4, 594.6; 73/379.07; 482/80
See application file for complete search history.

(56) References Cited

U.S. PATENT DOCUMENTS

| 4,791,813 | A * | 12/1988 | Kiffe ......................... 73/379.08 |
| 7,418,862 | B2 * | 9/2008 | Gruben et al. ............. 73/379.07 |
| 8,011,242 | B2 * | 9/2011 | O'Neill et al. ............. 73/379.01 |
| 8,584,520 | B2 * | 11/2013 | Kokkoneva et al. ........... 73/431 |
| 2011/0067503 | A1* | 3/2011 | Roudergues et al. ...... 73/862.51 |

* cited by examiner

*Primary Examiner* — Vicky Johnson
(74) *Attorney, Agent, or Firm* — Rosenberg, Klein & Lee (57) ABSTRACT

A pedal with a sensing device includes a spindle, a frame member, a receiving member and a sensing assembly, the frame member having a treading portion and a receiving channel, the receiving channel being adjacent to the treading portion and having an electricity supplier, the receiving member assembled to the frame member, the sensing assembly having a controlling unit electrically connected to the electricity supplier and a sensing unit electrically connected to the controlling unit. Under this arrangement, when the rider treads on the present invention, the pedal rotates relative to the spindle to generate a force and a rotation speed for the pedal; thereby, the force and the rotation speed of the present invention are detected by the sensing assembly.

9 Claims, 8 Drawing Sheets

PEDAL WITH A SENSING DEVICE

BACKGROUND OF THE INVENTION

1. Field of the Invention

The present invention relates to a pedal with a sensing device, and more particularly to a pedal with a sensing device so as to detect the force and the speed of the pedal when a rider treads on the pedal.

2. Description of Related Art

A conventional force detecting device for a bicycle is assembled with a bicycle for measuring the force which a rider treads on two pedals of the bicycle. Each pedal is rotatably assembled with a pedal axle. Said pedal axle is fastened with a positioning hole of a crank of the bicycle. The conventional force detecting device for a bicycle comprises a force sensor and at least one electronic apparatus. The force sensor is assembled on each pedal for detecting at least the perpendicular force relative to each pedal and converts the detection of force to a signal. The at least one electronic apparatus receives the signal from the force sensor and displays the signal. The force sensor and the at least one electronic apparatus are assembled onto an electric card member. The electric card member is electrically connected to a power supply for providing the electricity. A male connecting member is assembled with the electric card member and is passed through the positioning hole of the crank for engaging with a female connecting member which is assembled onto the pedal axle of the bicycle.

Under this arrangement, when the rider treads on the two pedals of the bicycle, at least the perpendicular force relative to each pedal is detected and delivered by the force sensor, and a quantity of the force is displayed on the at least one electronic apparatus.

However, the conventional force detecting device for a bicycle has several disadvantages described as following.

Firstly, since the structure of the conventional force detecting device for a bicycle is quite complicated, assembling the conventional force detecting device for a bicycle takes a lot of time.

Secondly, the structural strength of the pedal axle is reduced because so many elements are assembled within the pedal axle, so that a sustainability of the pedal axle is reduced as well.

The present invention has arisen to mitigate and/or obviate the disadvantages of the conventional.

SUMMARY OF THE INVENTION

The main objective of the present invention is to provide an improved pedal.

To achieve the objective, a pedal with a sensing device comprises a spindle, a frame member, a receiving member and a sensing assembly, one end of the spindle pivotally passed through the frame member, the frame member having a treading portion defined thereon, the treading portion corresponding to a buckle member, the frame member having a receiving channel opened therethrough, the receiving channel being adjacent to the treading portion, the receiving channel having an electricity supplier received therein, the receiving member being assembled to the frame member, the sensing assembly comprising a controlling unit and a sensing unit, the controlling unit being electrically connected to the electricity supplier, the sensing unit being electrically connected to the controlling unit, the controlling unit and the sensing unit being assembled to the receiving member and the treading portion of the frame member respectively. Wherein, the sensing assembly further has a wireless transmitting unit assembled on the controlling unit; a display unit is assembled on the bicycle and comprising a wireless signal receiver; the wireless signal receiver receives the signal delivered from the wireless transmitting unit so as to display an information on the display unit; the treading portion further comprises a front engaging segment, a protecting sheet and a rear engaging segment; a front part of the buckle member is engaged with the front engaging segment; a middle part of the buckle member abuts against the protecting sheet; a rear part of the buckle member is engaged with the rear engaging segment; the receiving channel is defined between the protecting sheet and the rear engaging segment; the sensing unit is selectively assembled to the bottom of the front engaging segment or the front bottom of the rear engaging segment of the treading portion, so that the sensing unit corresponds to an upper plane of the front part of the buckle member or to an upper plane of the rear part of the buckle member; the treading portion further comprises a depositing groove; the protecting sheet is assembled onto the depositing groove so as to cover the depositing groove; the sensing unit is assembled with a bottom plane of the protecting sheet and is deposited into the depositing groove; the depositing groove is defined between the front engaging segment and the rear engaging segment; the frame member further has a receiving room opened thereon; the receiving room communicates with the depositing groove; the receiving room communicates with the receiving channel; the spindle passes through the receiving room; the sensing unit further comprises a force sensor and a speed sensor; the receiving member comprises a receiving trough and a seal which covers the receiving trough; the controlling unit is received in the receiving trough of the receiving member and is covered by the seal; two ends of the receiving channel are opened and communicate with each other; the receiving channel is parallel to the spindle; two caps cover the two ends of the receiving channel respectively.

Further benefits and advantages of the present invention will become apparent after a careful reading of the detailed description with appropriate reference to the accompanying drawings.

DETAILED DESCRIPTION OF THE INVENTION

Referring to FIGS. 1-5, a pedal with a sensing device in accordance with the present invention comprises a spindle 1, a pedal body or frame member 2, a receiving member 3 and a sensing assembly 4.

Figure 1:
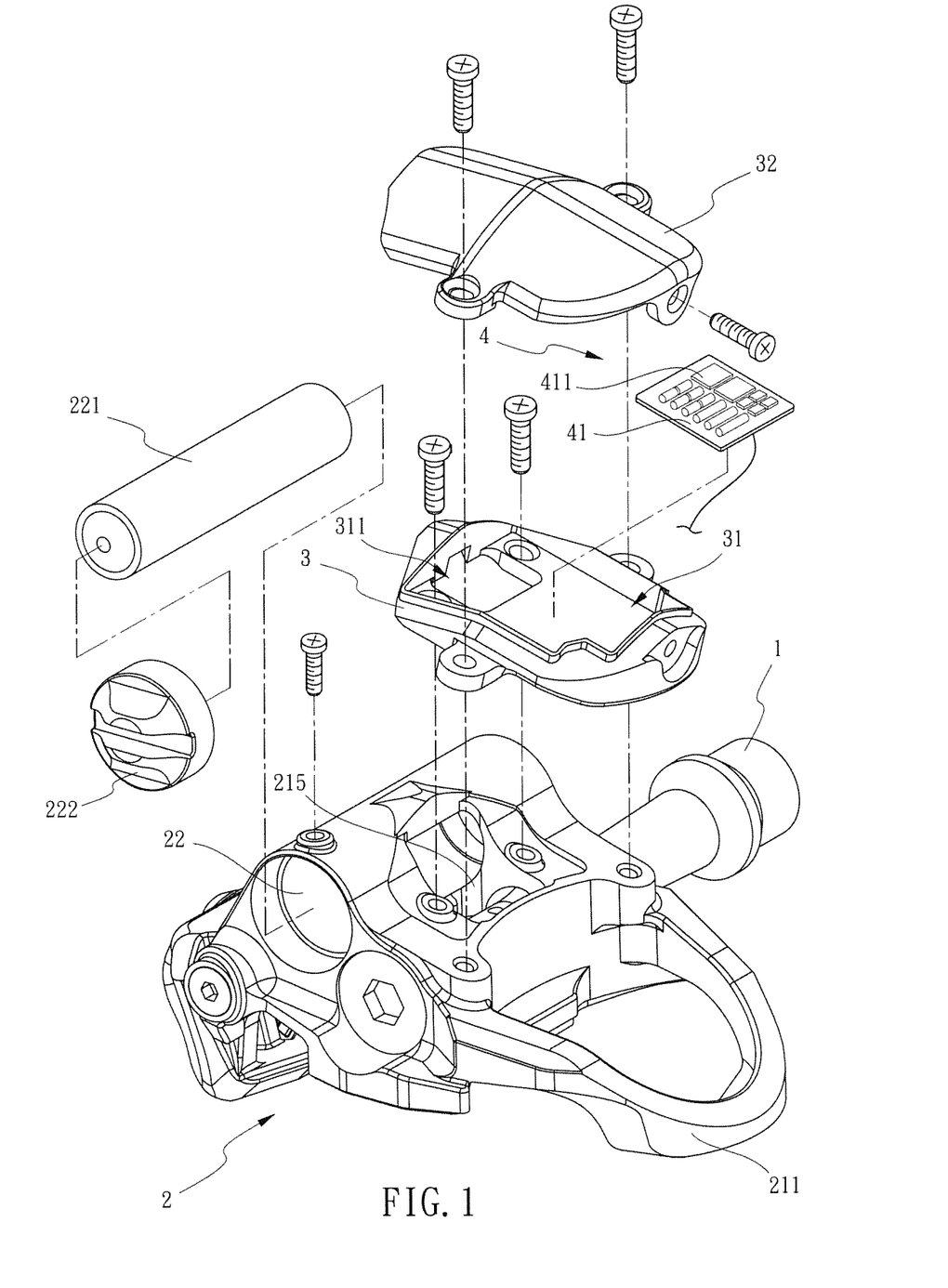
FIG. 1 is a partial exploded view of a pedal with a sensing device of the present invention.
Figure 2:
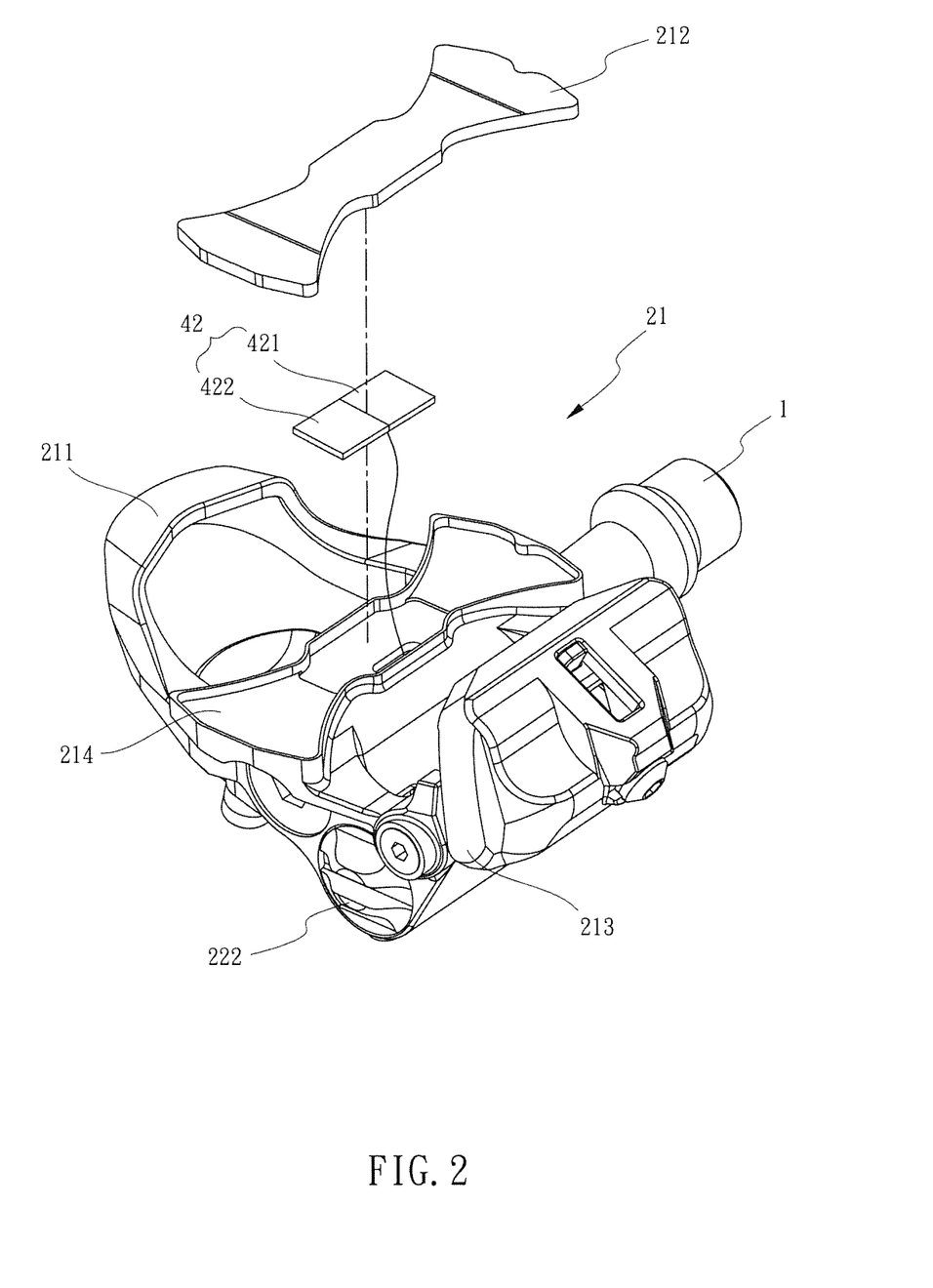
FIG. 2 is a perspective view for showing a protecting sheet and a sensing unit are installable with a treading portion of the present invention.
Figure 3:
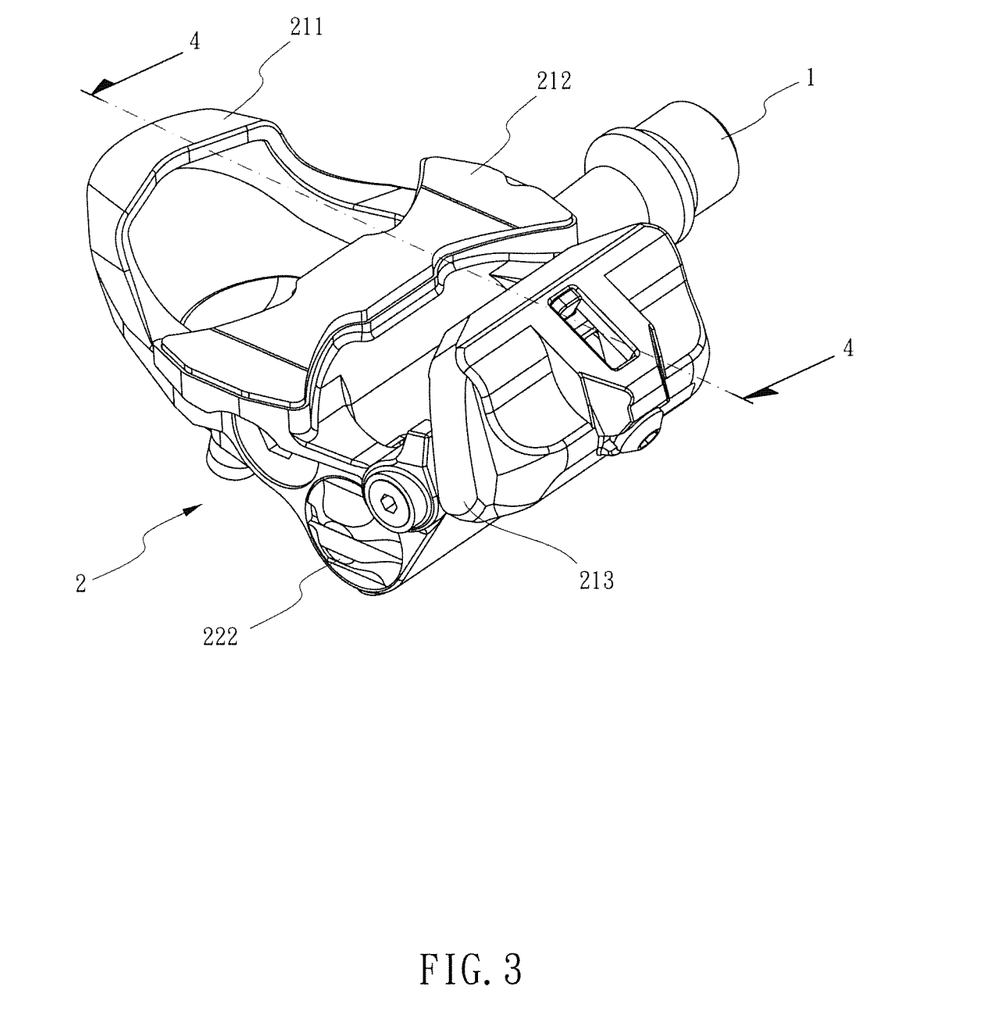
FIG. 3 is an assembled view of the present invention.
Figure 4:
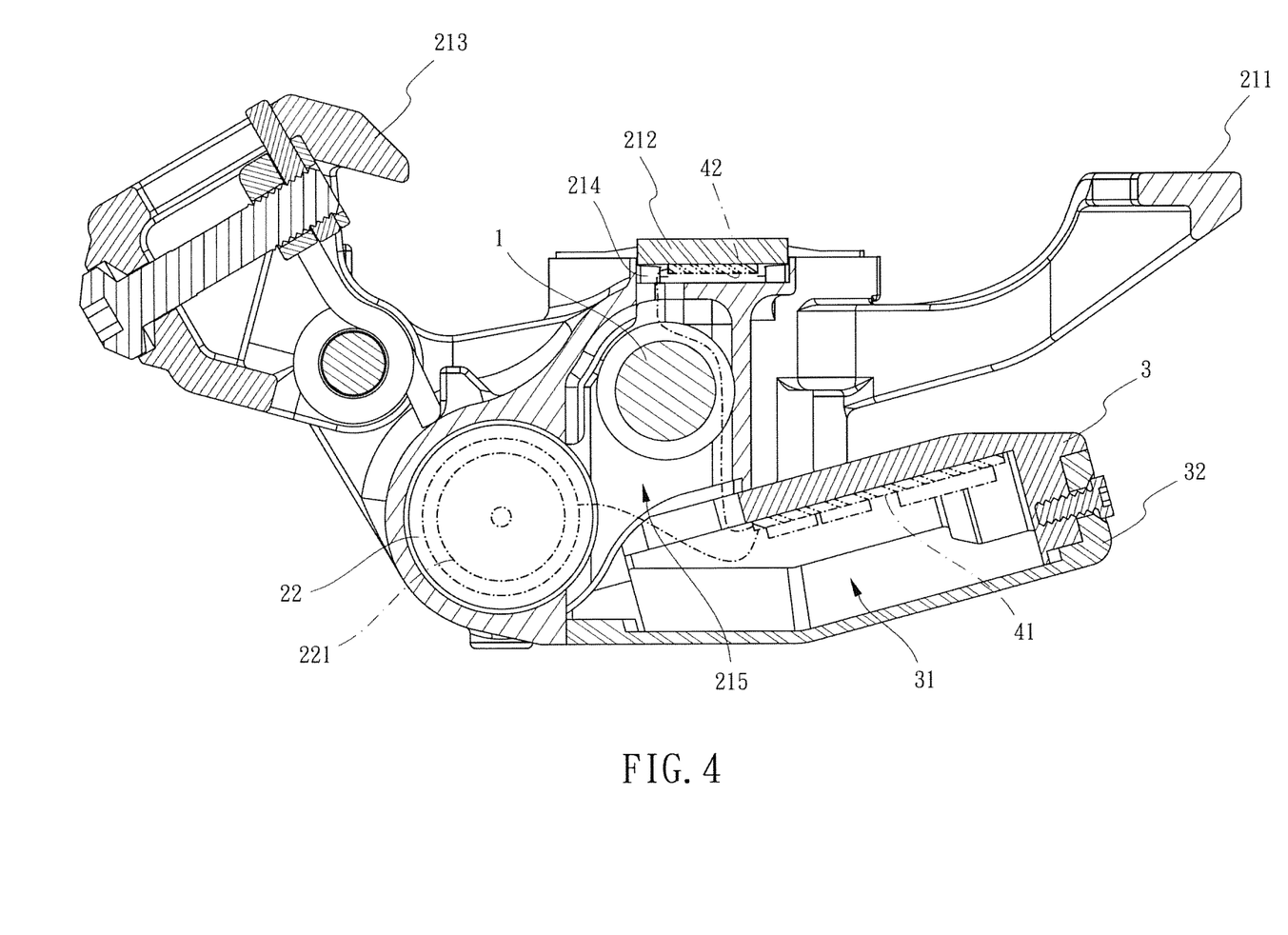
FIG. 4 is a cross-sectional view along line 4-4 shown in FIG. 3.

One end of the spindle 1 passes through a central bore (not numbered) of the frame member 2, and the other end of the spindle 1 is assembled to a crank of a bicycle (not shown).

Figure 5:
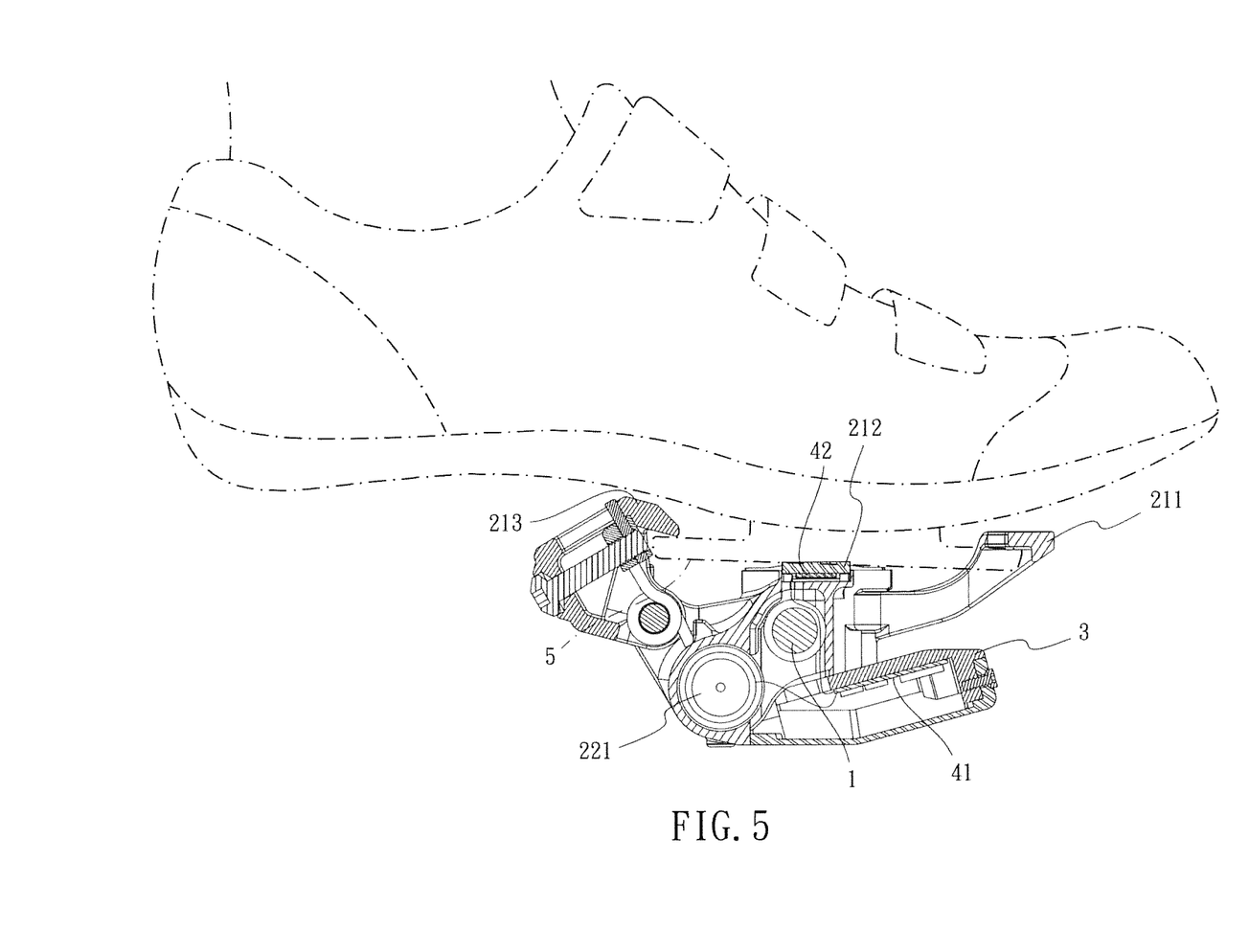
FIG. 5 is a schematic view for showing a rider treads on the present invention.

As shown in FIG. 1 and FIG. 5, the frame member 2 has a treading portion 21 at a top side thereof. The treading portion 21 corresponds to a buckle member 5 at a bottom of a shoe of a rider. The frame member 2 has a receiving chamber 22 disposed in a lower portion thereof, as shown in FIG. 1. The receiving chamber 22 has an electricity supplier 221 received therein. In this embodiment, the electricity supplier 221 is a battery (The type of the electricity supplier 211 is not limited in the present invention.). Two ends of the receiving chamber 22 are opened and communicate with each other. The receiving chamber 22 is parallel to the spindle 1. Two caps 222 cover the two ends of the receiving chamber 22 respectively.

The treading portion 21 further comprises a front engaging segment 211, a protecting sheet 212 and a rear engaging segment 213. A front part (not numbered) of the buckle member 5 is engaged with the front engaging segment 211. A middle part (not numbered) of the buckle member 5 abuts against the protecting sheet 212. A rear part (not numbered) of the buckle member 5 is engaged with the rear engaging segment 213. The receiving chamber 22 is defined between the protecting sheet 212 and the rear engaging segment 213.

The treading portion 21 further comprises a depositing groove 214. The protecting sheet 212 is assembled onto the depositing groove 214 so as to cover the depositing groove 214. The depositing groove 214 is defined between the front engaging segment 211 and the rear engaging segment 213. The frame member 2 further has a receiving room 215 opened thereon. The receiving room 215 communicates with the depositing groove 214. The receiving room 215 communicates with a middle portion of the receiving chamber 22. The spindle 1 passes through the receiving room 215.

The receiving member 3 is assembled onto a bottom of the frame member 2 and corresponds to the protecting sheet 212. The receiving member 3 comprises a receiving trough 31 and a seal 32 which covers the receiving trough 31. The receiving trough 31 has a void 311 defined at a bottom thereof. The void 311 communicates with the receiving room 215 of the treading portion 21.

The sensing assembly 4 comprises a controlling unit 41 and a sensing unit 42. The controlling unit 41 is electrically connected to the electricity supplier 221. The sensing unit 42 is electrically connected to the controlling unit 41. The controlling unit 41 and the sensing unit 42 are assembled to the receiving member 3 and the treading portion 21 of the frame member 2 respectively. In a preferred embodiment, the controlling unit 41 is received in the receiving trough 31 of the receiving member 3 and is covered by the seal 32, and the sensing unit 42 is assembled with a bottom plane of the protecting sheet 212 and is deposited into the depositing groove 214. The sensing unit 42 further comprises a force sensor 421 and a speed sensor 422. The sensing assembly 4 further has a wireless transmitting unit 411 assembled on the controlling unit 41.

Under this arrangement, when the rider treads on the present invention, the pedal rotates relative to the spindle 1 so as to generate a force and a rotation speed for the pedal; thereby, the force the rider applied to the present invention and the rotation speed of the present invention are detected by the sensing assembly 4 and are further converted as a signal.

Figure 6:
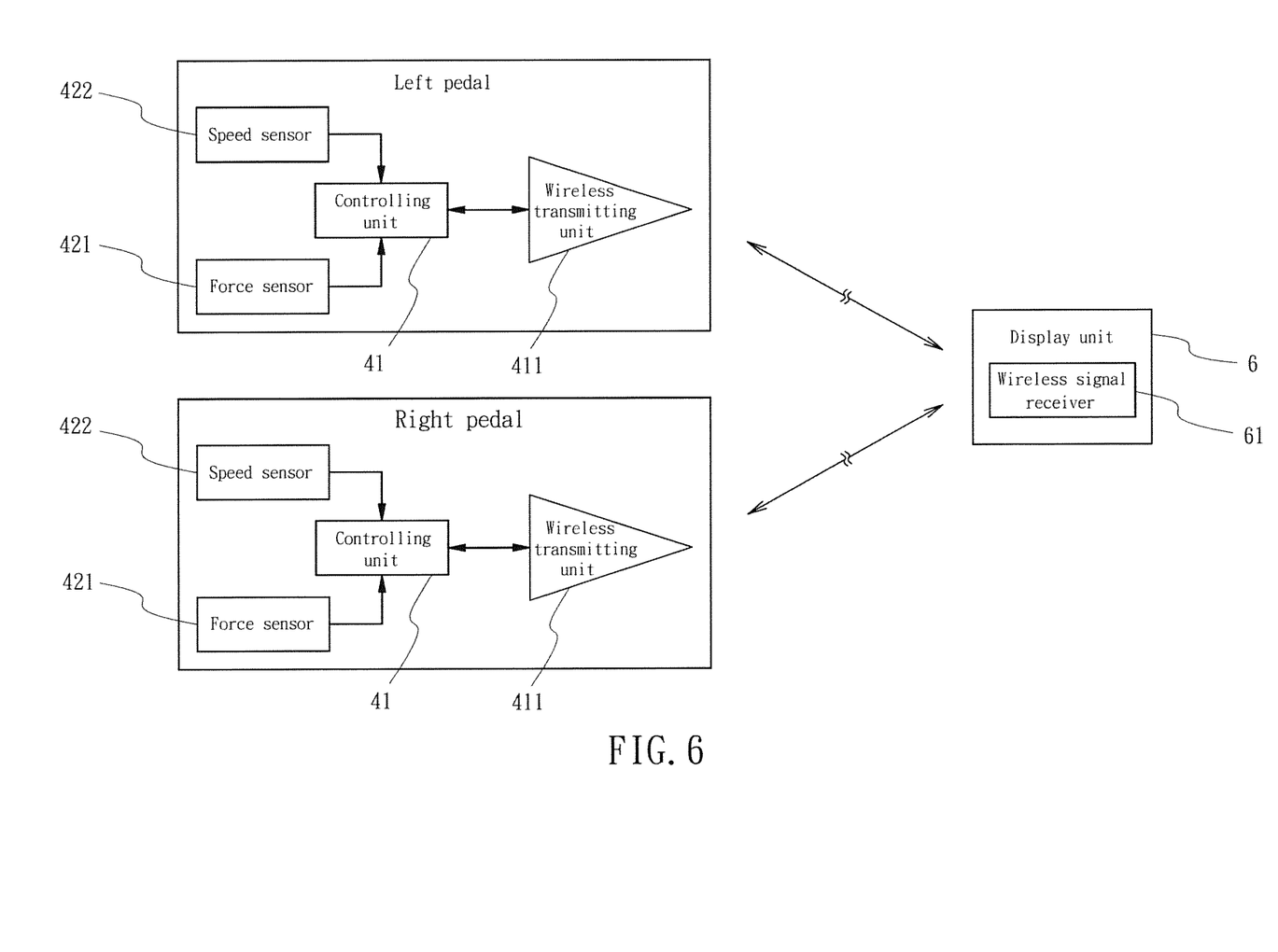
FIG. 6 is a block chart for showing a relationship between two pedals and a display unit.

Referring to FIGS. 5-6, the present invention further comprises a display unit 6. The display unit 6 is assembled on the bicycle. The display unit 6 comprises a wireless signal receiver 61. The wireless signal receiver 61 receives the signal delivered from the wireless transmitting unit 411 so as to display a result of the force and speed detection on the display unit 6 for the rider.

Before the rider rides on the bicycle, the front part of the buckle member 5 is engaged with the front engaging segment 211, the middle part of the buckle member 5 abuts against the protecting sheet 212 and the rear part of the buckle member 5 is engaged with the rear engaging segment 213. When the rider treads on the present invention, the force applied to the present invention changes a shape of the treading portion 21 slightly; since the sensing unit 42 is assembled with a bottom plane of the protecting sheet 212, a deformation extent of the protecting sheet 212 and the rotation speed of the present invention are detected by the sensing unit 42 firstly then said deformation extent and said rotation speed are converted to signals; thereby, the signals are delivered by the wireless transmitting unit 411 to the wireless signal receiver 61 so as to show the result of the force and speed detection on the display unit 6 for the rider.

Figure 7:
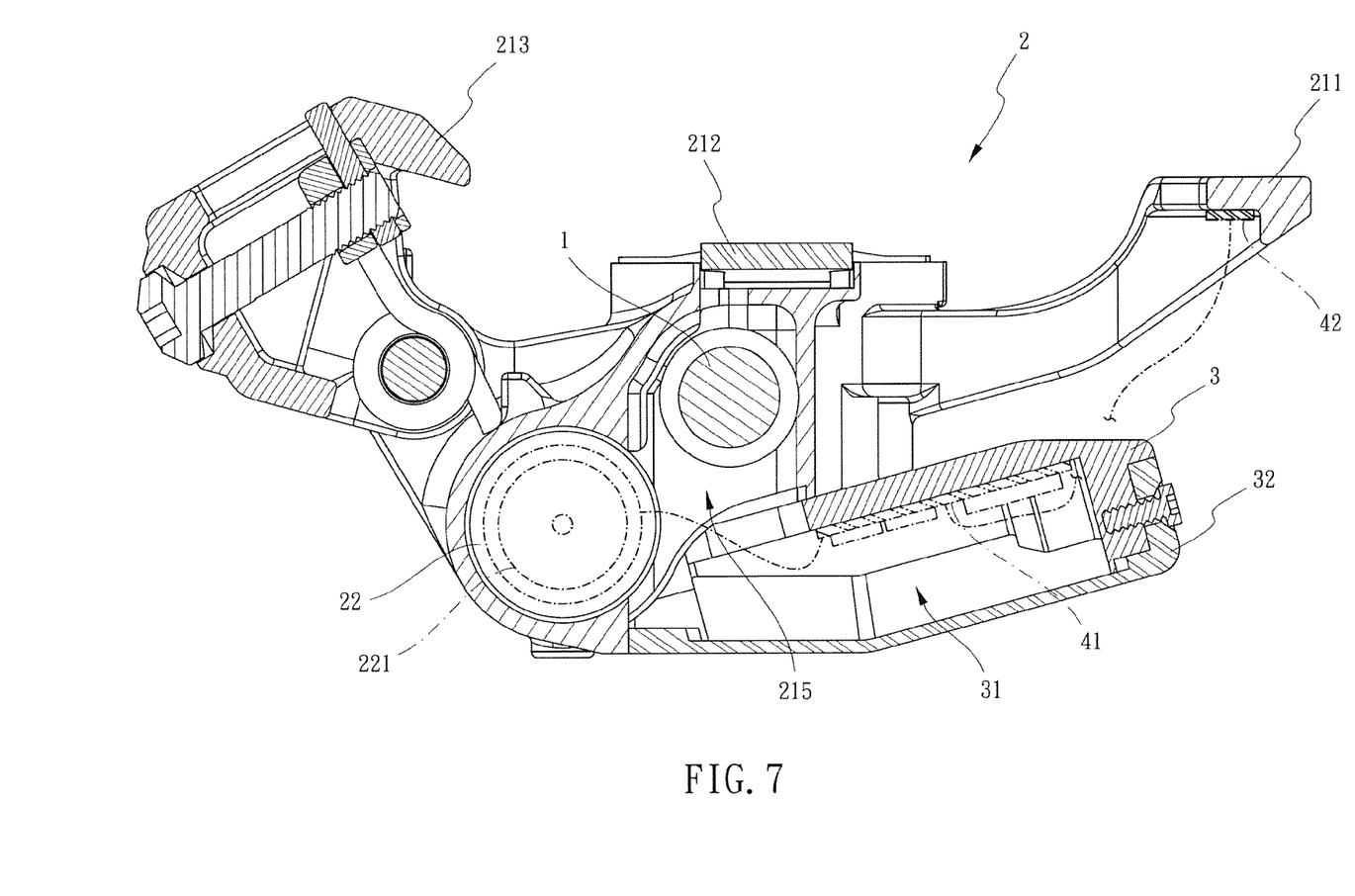
FIG. 7 is a schematic view for showing the sensing unit is assembled to a front engaging segment of the frame member.
Figure 8:
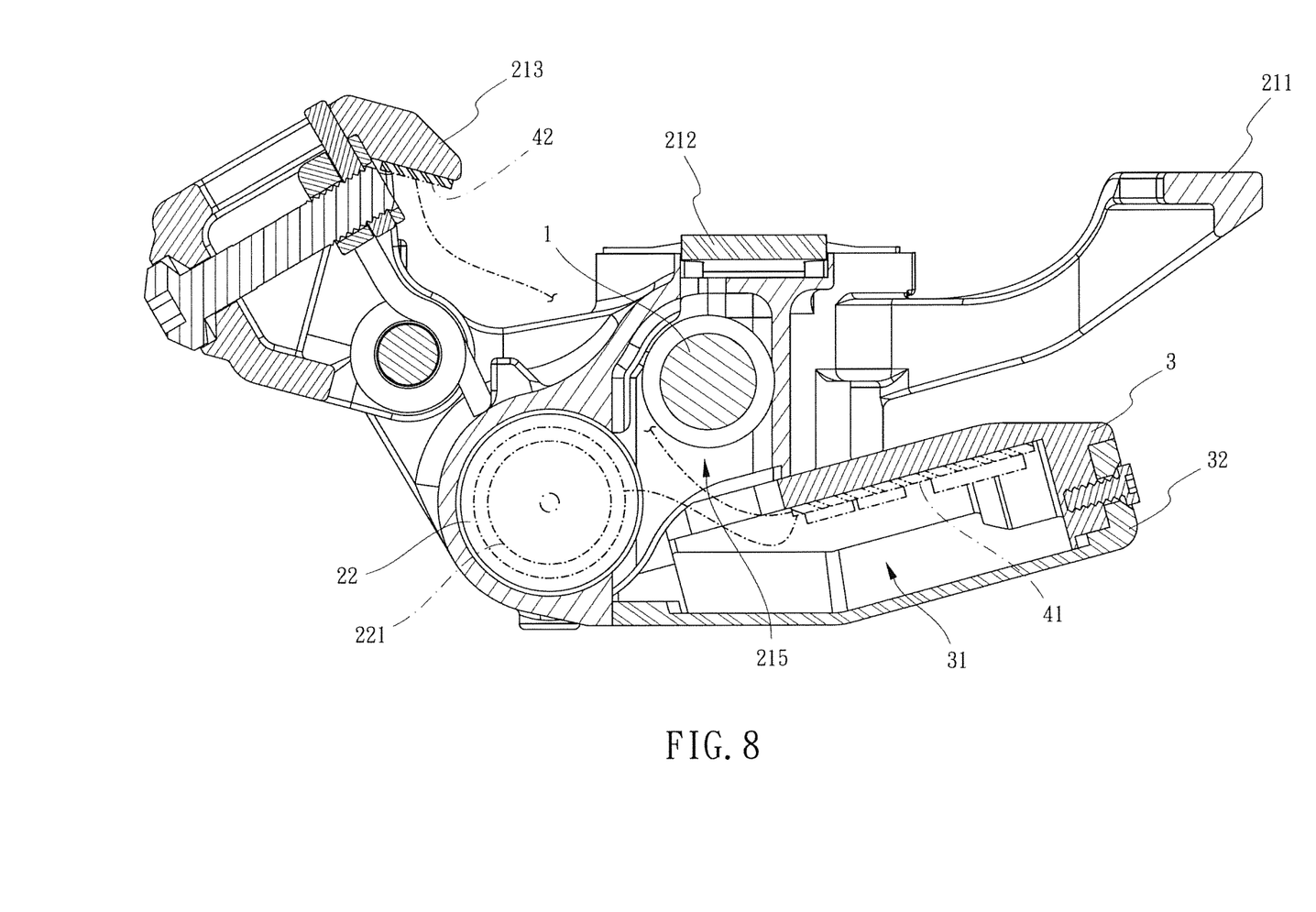
FIG. 8 is another schematic view for showing the sensing unit is assembled to a rear engaging segment of the frame member.

Referring to FIGS. 7-8, besides of assembling the sensing unit 42 at the bottom plane of the protecting sheet 212, the sensing unit 42 is also selectively assembled to the front engaging segment 211 or the rear engaging segment 213 of the treading portion 21. As shown in FIG. 7, the sensing unit 42 is assembled at the bottom of the front engaging segment 211 of the treading portion 21, so that the sensing unit 42 corresponds to an upper plane of the front part of the buckle member 5; similarly, as shown in FIG. 8, the sensing unit 42 is assembled at the bottom of the rear engaging segment 213 of the treading portion 21, so that the sensing unit 42 corresponds to an upper plane of the rear part of the buckle member 5.

All in all, the present invention has following advantages.

Firstly, since the structure of the present invention is much simpler as compared to the prior art, the rider assembles the present invention easily and quickly.

Secondly, as compared to the conventional force detecting device which is assembled within a pedal axle, the electricity supplier 221 and the sensing assembly 4 of the present invention is directly assembled with the frame member 2; that is, all of the elements in present invention are directly assembled on to the frame member 2. Therefore, the structural strength of the spindle 1 is retained, so that a sustainability of the spindle 1 is not reduced.

Although the invention has been explained in relation to its preferred embodiment, it is to be understood that many other possible modifications and variations can be made without departing from the spirit and scope of the invention as hereinafter claimed.

What is claimed is:
1. A pedal with a sensing device comprising:
a spindle, a pedal body, a receiving member and a sensing assembly;
one end of the spindle passing through a central bore of the pedal body;
the pedal body having a treading portion at a top side thereof, the treading portion corresponding to a buckle member, the pedal body having a receiving chamber defined in a lower portion thereof for accommodating an electricity supplier;
the receiving member being assembled with the pedal body; and
the sensing assembly comprising a controlling unit and a sensing unit, the controlling unit being electrically connected to the electricity supplier, the sensing unit being electrically connected to the controlling unit, the con- trolling unit being received in the receiving member and the sensing unit disposed in the treading portion of the pedal body.

2. The pedal with a sensing device as claimed in claim 1, wherein the sensing assembly further has a wireless transmitting unit assembled on the controlling unit; a display unit is assembled on a bicycle and comprising a wireless signal receiver; the wireless signal receiver receives the signal delivered from the wireless transmitting unit so as to display an information on the display unit.

3. The pedal with a sensing device as claimed in claim 1, wherein the treading portion further comprises a front engaging segment, a protecting sheet and a rear engaging segment; a front part of the buckle member is engaged with the front engaging segment; a middle part of the buckle member abuts against the protecting sheet; a rear part of the buckle member is engaged with the rear engaging segment; the receiving chamber is defined between the protecting sheet and the rear engaging segment.

4. The pedal with a sensing device as claimed in claim 3, wherein the sensing unit is selectively assembled to the bottom of the front engaging segment or the front bottom of the rear engaging segment of the treading portion, so that the sensing unit corresponds to an upper plane of the front part of the buckle member or to an upper plane of the rear part of the buckle member.

5. The pedal with a sensing device as claimed in claim 3, wherein the treading portion further comprises a depositing groove; the protecting sheet is assembled onto the depositing groove so as to cover the depositing groove; the sensing unit is assembled with a bottom plane of the protecting sheet and is deposited into the depositing groove; the depositing groove is defined between the front engaging segment and the rear engaging segment.

6. The pedal with a sensing device as claimed in claim 5, wherein the pedal body further has a receiving room opened thereon; the receiving room communicates with the depositing groove; the receiving room communicates with the receiving chamber; the spindle passes through the receiving room.

7. The pedal with a sensing device as claimed in claim 3, wherein the sensing unit further comprises a force sensor and a speed sensor.

8. The pedal with a sensing device as claimed in claim 1, wherein the receiving member comprises a receiving trough and a seal which covers the receiving trough; the controlling unit is received in the receiving trough of the receiving member and is covered by the seal.

9. The pedal with a sensing device as claimed in claim 1, wherein two ends of the receiving chamber are opened and communicate with each other; the receiving chamber is parallel to the spindle; two caps cover the two ends of the receiving chamber respectively.

* * * * *